(12) United States Patent
Nafziger et al.

(10) Patent No.: US 9,930,824 B2
(45) Date of Patent: Apr. 3, 2018

(54) SELF-PROPELLED AGRICULTURAL MACHINE WITH DUAL DRIVING MODES

(71) Applicant: AGCO Corporation, Hesston, KS (US)

(72) Inventors: Brendon Nafziger, Canton, KS (US);
Daniel J. Soldan, Hillsboro, KS (US);
Martin E. Pruitt, Hesston, KS (US);
Douglas R. Treffer, Newton, KS (US)

(73) Assignee: AGCO Corporation, Duluth, GA (US)

( * ) Notice: Subject to any disclaimer, the term of this patent is extended or adjusted under 35 U.S.C. 154(b) by 373 days.

(21) Appl. No.: 14/619,469

(22) Filed: Feb. 11, 2015

(65) Prior Publication Data

US 2015/0223386 A1     Aug. 13, 2015

Related U.S. Application Data

(60) Provisional application No. 61/938,257, filed on Feb. 11, 2014.

(51) Int. Cl.
*B60K 17/30*     (2006.01)
*A01B 69/00*     (2006.01)
*A01D 43/10*     (2006.01)

(52) U.S. Cl.
CPC .......... *A01B 69/007* (2013.01); *A01D 43/105* (2013.01)

(58) Field of Classification Search
CPC .... A01B 69/007; A01B 69/008; A01D 43/105

USPC .................................................. 180/6.24, 6.3
See application file for complete search history.

(56) References Cited

U.S. PATENT DOCUMENTS

| 2,818,125 | A | 12/1957 | Vogelaar |
| 7,918,304 | B2 | 4/2011 | Perry |
| 8,496,256 | B2 | 7/2013 | Bebernes |
| 8,690,171 | B2 | 4/2014 | Clark |
| 8,733,770 | B2 | 5/2014 | Nafziger |
| 8,893,831 | B2 | 11/2014 | Otto |
| 2005/0115746 | A1 | 6/2005 | Dunn et al. |
| 2013/0075169 | A1* | 3/2013 | Otto ........................ B62D 9/00 180/6.24 |
| 2014/0138165 | A1* | 5/2014 | Bebernes ............... B62D 11/04 180/6.3 |

* cited by examiner

*Primary Examiner* — Joseph M Rocca
*Assistant Examiner* — Conan D Duda

(57) ABSTRACT

A windrower has a first dual-path steering mode, causing a left drive wheel and a right drive wheel to concurrently rotate, wherein the rotation of the left drive wheel is in a direction opposite that of the rotation of the right drive wheel and the position of tailwheel casters are not controlled but are permitted unconstrained rotation. The windrower also has a second tailwheel steering mode non-overlapping in operation with the dual-path steering mode, causing the left drive wheel and the right drive wheel to rotate concurrently in only a same direction and the tailwheel casters are steered based in part on tailwheel caster steer position information received from a sensor.

5 Claims, 8 Drawing Sheets

SELF-PROPELLED AGRICULTURAL MACHINE WITH DUAL DRIVING MODES

CROSS REFERENCE TO RELATED APPLICATION

This application claims the benefit of U.S. Provisional Application No. 61/938,257, filed Feb. 11, 2014, which is hereby incorporated by reference in its entirety.

BACKGROUND OF THE INVENTION

Field of Invention

The present disclosure is generally related to agricultural machines and, more particularly, self-propelled windrowers.

Description of Related Art

Self-propelled windrowers utilize a dual-path steering system to achieve maximum maneuverability while cutting crops in the field. However, this steering system is not ideal for high speed transport due to the machine's inherent instability. In addition, the machine is not suited for pulling a towed implement, such as a header with a transport kit installed, due to a zero radius turning that the machine is capable of via the dual-path steering functionality. Such a maneuver, even if unintentional, may result in the windrower and towed implement becoming "jack-knifed."

OVERVIEW OF THE INVENTION

In one embodiment, the invention is directed a windrower machine operable in two steering modes selectable by an operator of the machine, the dual steering modes being a dual-path steering mode and a tailwheel steering mode, the two steering modes being mutually exclusive. The machine includes a chassis and an engine mounted on the chassis. The machine also includes plural drive wheels coupled to the chassis and a ground drive system having plural wheel motors and plural hydraulic wheel propel pumps coupled to a respective one of the plural drive wheels, the hydraulic wheel propel pumps being powered by the engine and each wheel motor being powered by its respective hydraulic wheel propel pump. The machine also has plural tailwheel caster assemblies coupled to opposing sides of the chassis, each tailwheel caster assembly having a tailwheel caster, a sensor, and a steering cylinder configured to operably control a steering position of the tailwheel caster when in the tailwheel steering mode. The machine also has a user interface with a steering wheel and a forward-neutral-reverse (FNR) lever operable to control the ground drive system, the FNR lever having a forward position, a neutral position and a reverse position. The machine also has a controller configured to selectably operate the ground drive system in either the dual path steering mode or in the tailwheel steering mode. The ground drive system drives the plural drive wheels in either the same direction or in the opposite direction of rotation relative to each other depending on the position of the steering wheel and FNR lever and the position of tailwheel casters are not controlled by the steering cylinders but are permitted unconstrained rotation while in the dual-path steering mode. The ground drive system drives the plural drive wheels concurrently only in the same direction of rotation and being incapable of counter rotation, and the steering cylinder provides controlled and limited steer-rotation of the tailwheel caster based in part on tailwheel caster steer position information received from the sensor in the tailwheel steering mode.

In another embodiment, the invention is directed to a method implemented in a machine including in a first steering mode, causing a left drive wheel and a right drive wheel to concurrently rotate, wherein the rotation of the left drive wheel is in a direction opposite that of the rotation of the right drive wheel; and in a second steering mode non-overlapping in operation with the first steering mode, causing the left drive wheel and the right drive wheel to rotate concurrently in only a same direction.

These and other features and advantages of this invention are described in, or are apparent from, the following detailed description of various exemplary embodiments of the systems and methods according to this invention.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Figure 1:
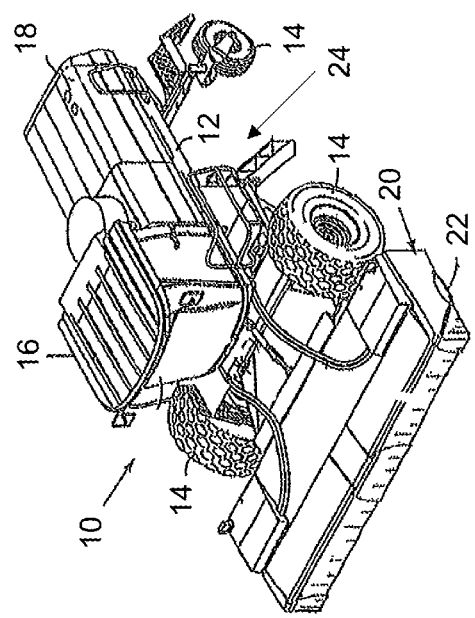
FIG. 1 is a schematic diagram that illustrates, in front perspective view, an example machine in which an embodiment of a dual mode steering system may be implemented.

Certain embodiments of a dual mode steering system and method are disclosed that enable a self-propelled machine, such as a self-propelled windrower, to operate in two distinct steering modes: a dual-path steering mode and a tailwheel steering mode. In the dual-path steering mode, the windrower drives and operates like a typical windrower in the sense that all steering is accomplished through differential wheel speeds and one or more tailwheel casters are free to rotate. In the tailwheel steering mode, the tailwheel casters are directly controlled by steering cylinders through a fixed angle of steer-rotation, and plural hydraulic wheel propel pumps are reconfigured by a controller to enable only forward and reverse machine travel. In effect, the tailwheel steering mode enables the windrower to steer similarly to a combine, forage harvester, or other rear wheel steered machines.

By contrast, in some conventional windrowers, the rear wheels are controlled by the steering wheel, but not according to a directly sensed, closed loop feedback mechanism, and only beyond a certain speed. Some conventional windrowers reverse the operator station and drive the machine with the caster wheels in front, enabling a towing capability yet not addressing, at least sufficiently, the risk of jack-knifing of the combined machines. In short, neither of these conventional systems is capable of a true rear steering mode, and both have shortcomings resulting from operations of the dual-path manner of operation. Certain embodiments of a dual mode steering system, through its closed loop feedback system in tailwheel steering mode and reconfiguration of the ground drive system, provides for stable operation and minimized risk of jack-knifing the windrower.

Having summarized certain features of a dual mode steering system of the present disclosure, reference will now be made in detail to the description of the disclosure as illustrated in the drawings. While the disclosure will be described in connection with these drawings, there is no intent to limit it to the embodiment or embodiments disclosed herein. For instance, though emphasis is placed on a machine in the agricultural industry, and in particular, a self-propelled windrower, certain embodiments of a dual mode steering system may be beneficially deployed in other machines (in the same or other industries) where stable operation in transport operations is desired and/or where zero radius turn functionality is implemented. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the windrower looking forwardly.

Reference is made to FIG. 1, which illustrates an example agricultural machine where an embodiment of a dual mode steering system may be implemented. One having ordinary skill in the art should appreciate in the context of the present disclosure that the example agricultural machine, depicted in FIG. 1 as a self-propelled windrower 10, is merely illustrative, and that other machines and/or components with like functionality may deploy certain embodiments of a dual mode steering system. The self-propelled windrower 10 is operable to mow and collect standing crop in the field, condition the cut material as it moves through the machine to improve its drying characteristics, and then return the conditioned material to the field in a windrow or swath. In some implementations, the windrower 10 may tow an implement (not shown). The windrower 10 may include a chassis or frame 12 supported by wheels 14 (although tracks may be used in some embodiments, or other configurations in the number and/or arrangement of wheels may be used in some embodiments) for movement across a field to be harvested. The chassis 12 carries a cab 16, within which an operator may control certain operations of the windrower 10, and a rearwardly spaced compartment 18 housing a power source (not shown) such as an internal combustion engine. The chassis 12 also supports a ground drive system that, in one embodiment, when powered by the engine, causes differential rotation of the wheels according to a dual path steering mechanism as is known in the art.

A coupled working implement, depicted in FIG. 1 as a harvesting header 20, is supported on the front of the chassis 12 in a manner understood by those skilled in the art. The header 20 may be configured as a modular unit and consequently may be disconnected for removal from the chassis 12. As is also known in the art, the header 20 has a laterally extending crop cutting assembly 22 in the form of a low profile, rotary style cutter bed located adjacent the front of the header 20 for severing crop from the ground as the windrower 10 moves across a field. However, one skilled in the art will understand that other types of crop cutting assemblies 22, such as sickle style cutter beds, may also be used in some embodiments.

The windrower 10 also includes a dual mode steering system 24, which may in one embodiment include one or more controllers, a ground drive system, a tailwheel caster system, and a plurality of sensors that monitor, in real time, positions of one or more machine navigation controls and a respective steering position of each tailwheel caster, as further described below. The dual mode steering system 24 enables switching between, and mutually exclusive operation of, dual-path steering and tailwheel steering modes.

During a harvesting operation, the windrower 10 (with or without a towed implement) moves forward through the field with the header 20 lowered to a working height. The steering modes may be selected by an operator (e.g., residing in the cab 16 or located remotely in some embodiments), or the dual mode steering system 24 may transition the windrower 10 between modes automatically (e.g., at a defined ground speed and/or based on other parameters or conditions).

Figure 2:
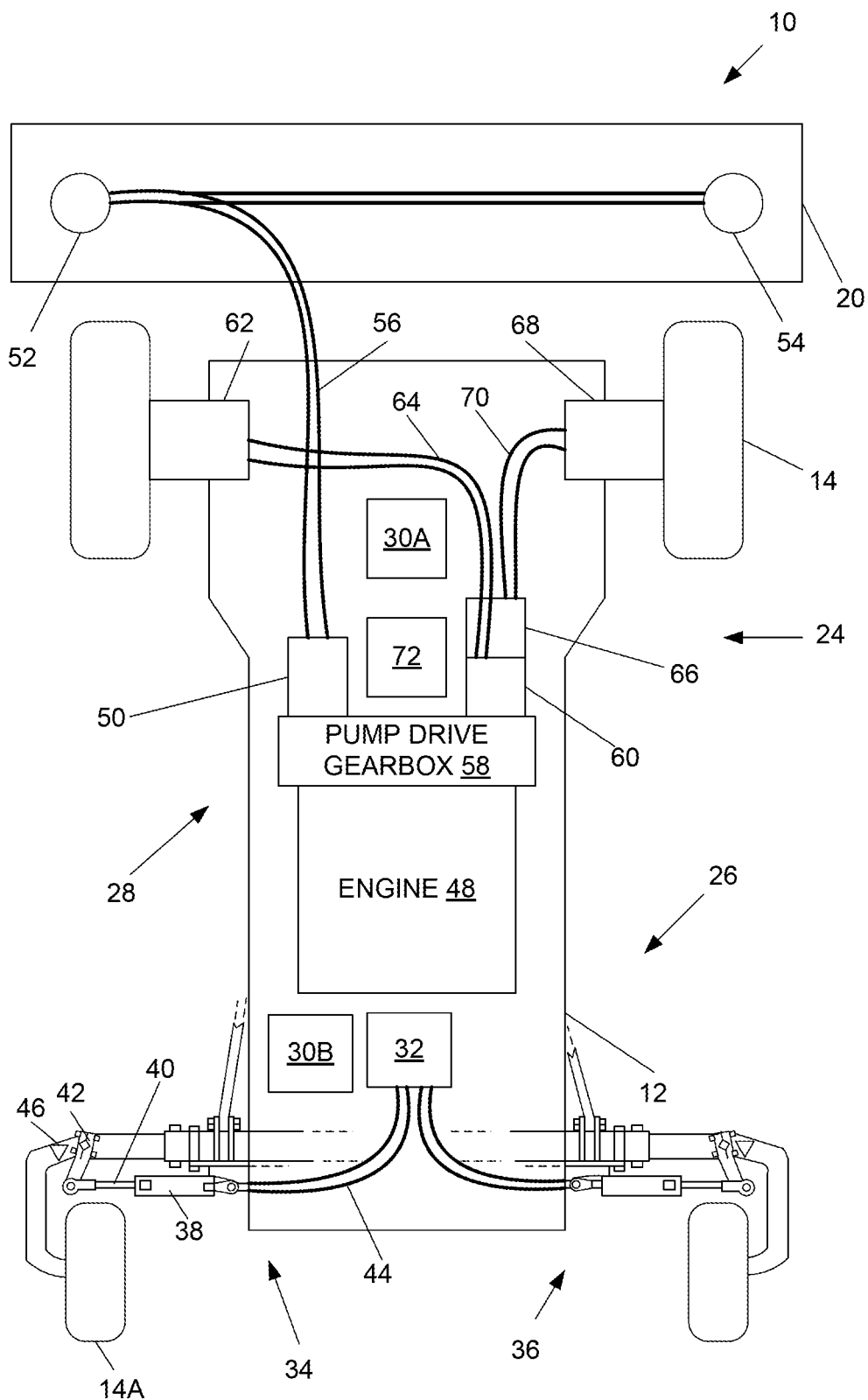
FIG. 2 is a schematic diagram that illustrates, in top fragmentary plan view, an embodiment of an example windrower equipped with an embodiment of an example dual mode steering system.

Referring now to FIG. 2, shown in fragmentary, overhead plan view is the example windrower 10 of FIG. 1. It should be appreciated, within the context of the present disclosure, that the example construction of the windrower 10 depicted in FIG. 2 is merely illustrative of a type of environment in which an embodiment of a dual mode steering system 24 may be implemented, and that other designs or machines may likewise provide a suitable environment with beneficial effect. As shown (with certain well-known features omitted for brevity and clarity), the windrower 10 is depicted with the header 20 and the chassis 12, which is coupled to the header 20 and to the wheels 14 (including rear tailwheel casters 14A, where "A" signifies a rear tailwheel or caster as opposed to a front drive wheel). While the tailwheel casters 14A are described as being in the rear of the windrower 10 as directed to the Figures, one skilled in the art will understand that the windrower 10 may be operated in both directions such that the tailwheel casters 14A may lead the drive wheels 14 in certain driving conditions such as high-speed, on-road operations. In one embodiment, the dual mode steering system 24 comprises a tailwheel caster system 26, a ground drive system 28, and one or more controllers, such as controllers 30A and 30B (as described further below).

In one embodiment, the tailwheel caster system 26 comprises a manifold 32 and two (2) tailwheel caster assemblies 34 (left rear) and 36 (right rear). In some embodiments, a different quantity of tailwheel caster assemblies 34, 36 and/or manifolds 32 may be used, and in some embodiments, the tailwheel caster assemblies 34 and 36 integrate functionality of the manifold 32. The manifold 32 comprises one or more control valves proportional valves and/or pilot valves that control the flow of hydraulic fluid into and out of the tailwheel caster assemblies 34 and 36. The manifold 32 is operably coupled to the controller 30B, the latter providing commands to the manifold 32 based on input from one or more machine navigation controls, as described further below. In some embodiments, functionality of the controller 30B may be integrated with the controller 30A, such that commands are provided to the manifold 32 via the controller 30A. In some embodiments, the controller 30B may provide commands to steering cylinders that integrate functionality of the manifold 32. Focusing on the tailwheel caster assembly 34 (with the same or similar applicability to the tailwheel caster assembly 36, the description of the same omitted here for brevity), in one embodiment, the tailwheel caster assembly 34 comprises a steering cylinder 38, a rod 40, a pivot arm 42, hydraulic fluid lines 44, a sensor 46 (represented schematically by a triangle in FIG. 2), and the rear or tailwheel caster 14A. Note that some embodiments of the tailwheel caster assembly 34 may include additional, fewer, and/or different components, in the same or different arrangement. Certain portions of, or associated with, the tailwheel caster assemblies 34 and 36 and/or the chassis 12 are shown in fragmentary view to avoid obfuscating operations with known structures. The steering cylinder 38 houses a piston (or plural pistons in some embodiments) that slides back and forth within the interior of the steering cylinder 38 based on hydraulic fluid displacement, as triggered and controlled by the control valves of the manifold 32 and conveyed over the fluid lines 44 as would be understood by one skilled in the art. In one embodiment, the control valves enable hydraulic fluid on both sides of the piston to be at the same pressure when in the dual-path steering mode such that the steering cylinder 38 freely moves as dictated by rotation of the tailwheel caster 14A. The steering cylinder 38 is coupled to the rod 40 that is coupled to, and moves synchronously with, the internal piston, which directly causes the pivot arm 42 to pivot or rotate (e.g., pivoting along a vertical or near vertical axis, enabling rotation to the left and right) the tailwheel caster 14A in the tailwheel steering mode. In the tailwheel steering mode, the sensor 46 senses the position of the left tailwheel caster 14A (e.g., the steer-position), providing feedback to the controller 30B. The controller 30B, in turn, provides commands to the control valve(s) of the manifold 32 based on the feedback, enabling precise adjustment of the fluid displacement over the hydraulic fluid lines 44 into and out of the steering cylinder 38 to enable a controlled (e.g., constrained to less than 360 degrees of steer rotation) adjustment of the steering position of the left tailwheel caster 14A.

Continuing, the windrower 10 comprises an engine 48, the ground drive system 28, and a header drive system that comprises a header drive pump 50 that is fluidly coupled to header drive motors 52 and 54 via hydraulic fluid lines, such as hydraulic fluid line 56, as is known. The ground drive system 28 is powered by the engine 48, which is mounted to the chassis 12. The ground drive system 28 comprises a pump drive gearbox 58 that is coupled to the engine 48. The ground drive system 28 further comprises a left wheel propel pump 60 coupled to the pump drive gearbox 58, and further coupled to a left wheel drive motor 62 via hydraulic fluid lines, such as hydraulic fluid line 64. The ground drive system 28 also comprises a right wheel propel pump 66 coupled to the pump drive gearbox 58, and further coupled to a right wheel drive motor 68 via hydraulic fluid lines, such as hydraulic fluid line 70. Although depicted as comprising a by-wire system, other hydraulic mechanisms may be used to facilitate ground transportation in some embodiments, and hence are contemplated to be within the scope of the disclosure.

Figure 3:
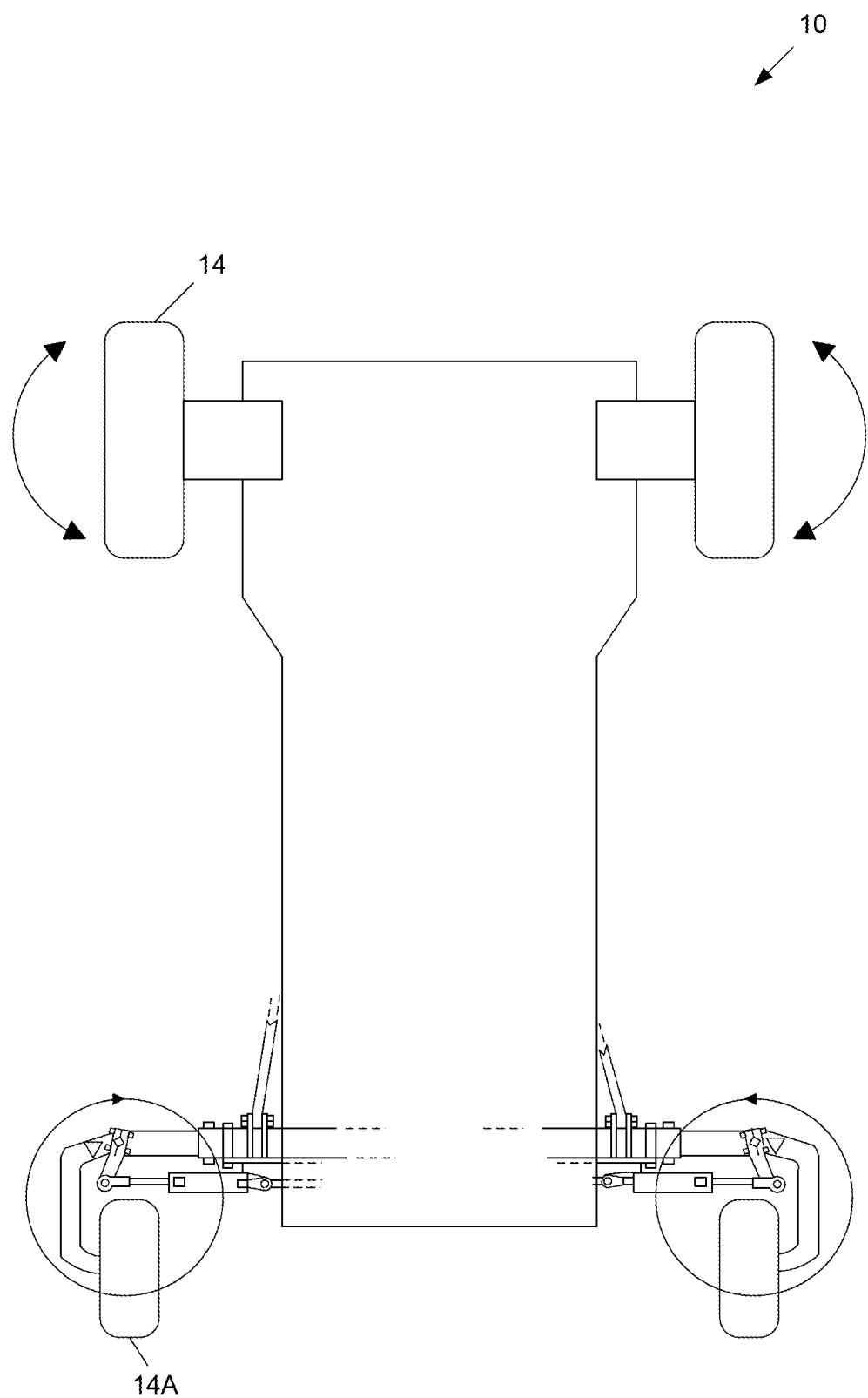
FIG. 3 is a schematic diagram that illustrates, in top fragmentary plan view, an embodiment of an example windrower operating in a dual-path steering mode.

In dual-path steering mode operation, in one embodiment, software in the controller 30A provides for control of the ground drive system 28. Sensors are located on or proximal to the machine navigation controls, or generally, a user interface 72 (e.g., which includes a steering wheel and a forward-neutral-reverse (FNR) lever) in the cab 16 (FIG. 1), where operator manipulation of the steering wheel and/or FNR lever causes movement of the same that is sensed by the sensors. These sensors feed signals to the controller 30A, which in turn provide control signals to the propel pumps 60 and 66 to achieve the requested speed and travel direction. The signaling from the controller 30A causes a change in fluid displacement in the respective propel pumps 60 and 66, each displacement in turn driving the respective wheel drive motors 62 and 68 via hydraulic fluid lines 64 and 70. With continued reference to FIG. 2, attention is directed to FIG. 3, which illustrates the dual-path steering mode using select components of the windrower 10 depicted in FIG. 2 for illustration. The dual-path steering mode generally comprises the traditional dual-path steering that most self-propelled windrowers operate under, where all steering for the windrower is accomplished through differential speeds of the two drive wheels. In this mode, the tailwheel casters 14A are free to rotate, as required by the movement of the windrower 10. As to the drive wheels 14, rotating the steering wheel may increase the speed of one drive wheel 14 (e.g., left) while slowing the speed of the other drive wheel 14 (e.g., right) by the same amount. In other words, steering for the windrower 10 may be achieved by increasing the speed of one drive wheel 14 while decreasing the speed of the opposite drive wheel 14 by the same amount (yet, when both drive wheels 14 are rotating, they rotate in the same direction). Using some example values for illustration, if the windrower 10 is traveling at 5 miles per hour (MPH) forward, a steering command may result in the left drive wheel 14 driven at a speed of 6 MPH and the opposing right drive wheel 14 driven at a speed of 4 MPH, resulting in a right hand turn. As another example, if the windrower 10 is traveling forward at 1 MPH, the same steering command may result in the left drive wheel 14 being driven at 2 MPH forward and the opposing right drive wheel 14 driven to a complete stop (or equivalently, permitted to stop), with the magnitude of the difference in each case (e.g., 2 MPH) between the two drive wheels 14 being the same. At slower ground speeds in the dual-path steering mode, the drive wheels 14 may counter-rotate (as depicted by the dual-headed arrows adjacent each drive wheel 14, where one drive wheel 14 is driven in the forward direction and the opposing drive wheel 14 is driven in reverse), causing the windrower 10 to spin in a zero radius turn. The zero radius turn is enabled during the neutral position of the FNR lever, and as described above, involves the drive wheels 14 rotating in opposite directions (e.g., while the left front drive wheel 14 is rotating in a clockwise direction, for instance, the right front drive wheel 14 is rotating in a counter-clockwise direction). Stated otherwise, for the zero radius turn function, the front drive wheels are driven (e.g., via the propel pumps 60 and 66 and wheel drive motors 62 and 68, as commanded or signaled by the controller 30A) in opposite directions (respectively forward and reverse). Continuing the illustrative examples described above, for a similar steering command and operation in neutral, the command results in the left drive wheel 14 driven at a speed of 1 MPH forward and the right drive wheel 14 driven 1 MPH in reverse (causing the windrower 10 to counter rotate to the right). The zero radius turn is a typical field operation used to achieve maximum maneuverability. Because of the manner of operation in the dual-path steering mode, it is noted that the windrower 10 steers backwards when traveling in reverse (e.g., rotating the steering wheel to the left while backing up causes the windrower 10 to turn to the right, referred to as "S-steering."). At the same time, as noted above, the tailwheel casters 14A, which are un-driven, are free to rotate (e.g., without constraint or limitation) in known manner in the dual-path steering mode, as depicted by the 360 degree arrowed circles representing the steer-rotation of the tailwheel caster 14A.

Figure 4:
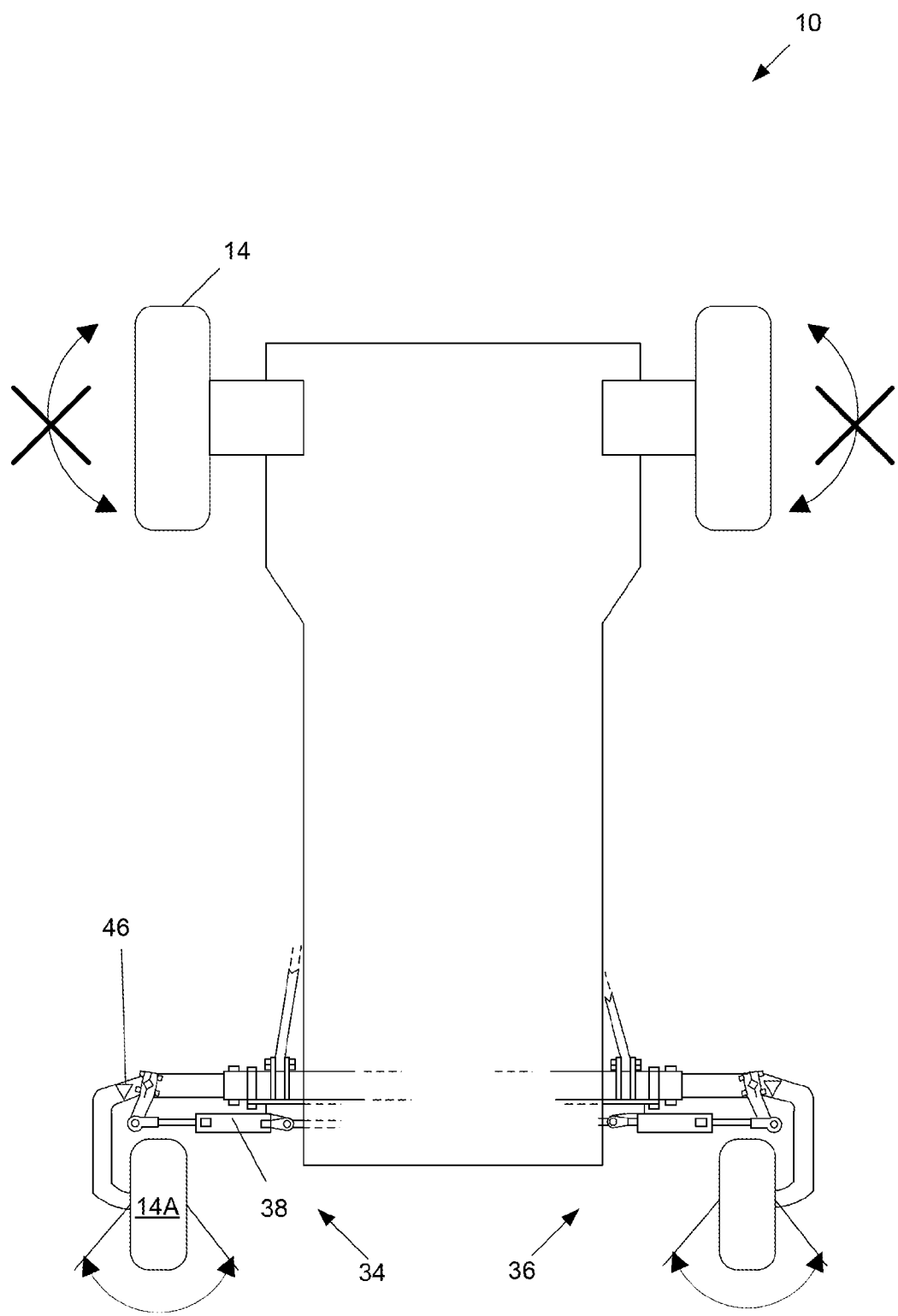
FIG. 4 is a schematic diagram that illustrates, in top fragmentary plan view, an embodiment of an example windrower operating in a tailwheel steering mode.

In tailwheel steering mode operation, in one embodiment, software in the controller 30A provides for control of the ground drive system 28, and software in the controller 30B provides control for the tailwheel caster system 26. In general, the tailwheel casters 14A operate according to a steer-rotation that is positively controlled, and the propel system of the ground drive system 28 is reconfigured to be incapable of counter rotation (e.g., the zero radius turn). Referring to FIGS. 2 and 4, the controller 30A drives the ground drive system 28 in similar manner to that of the dual-path steering mode, except the controller 30A prevents counter-rotation of the front drive wheels 14, as depicted by the "X" through the dual-arrows located adjacent the wheels 14 in FIG. 4. It is noted that for a by-wire system as depicted in FIG. 4, this reconfiguration of the hydrostatic propel system may be achieved in part or entirely within software, though in some embodiments, such as operating under a mechanically controlled drive system, the reconfiguration may involve physical and/or hydraulic changes as should be appreciated by one having ordinary skill in the art. In the tailwheel steering mode, when the machine is in neutral (e.g., the position of the FNR lever), rotation of the steering wheel only affects the angle of the tailwheel casters 14A and does not result in the machine operating according to a zero radius turn as it does in the dual-path steering mode. The ground drive system 28 enables drive wheel speeds to differ only enough to provide a differential effect, which results in the front drive wheel rotation, when concurrently driven, only in the same direction (e.g., either both rotating forward or both rotating in reverse). In reverse, the steering effect is the same or similar to that achieved for any wheel steered machine. For the tailwheel caster system 26, the controller 30B and each tailwheel caster assembly 34 and 36, respectively, cooperate as a closed loop feedback control system, wherein the steer-rotation of each tailwheel caster 14A is based on sensor input (e.g., from sensor 46 for the left tailwheel caster 14A, and in one embodiment, using a sensor similarly configured for the right tailwheel caster wheel) and user interface input (e.g., from user interface 72), causing the steering cylinders (e.g., steering cylinder 38) to control the steer-rotation of the tailwheel casters 14A to limit the steer-rotation to a defined arc, as depicted in FIG. 4 by the dual-arrows for each tailwheel caster 14A in less than the 360 degree arc that is enabled during the dual-path mode.

Figure 5A:
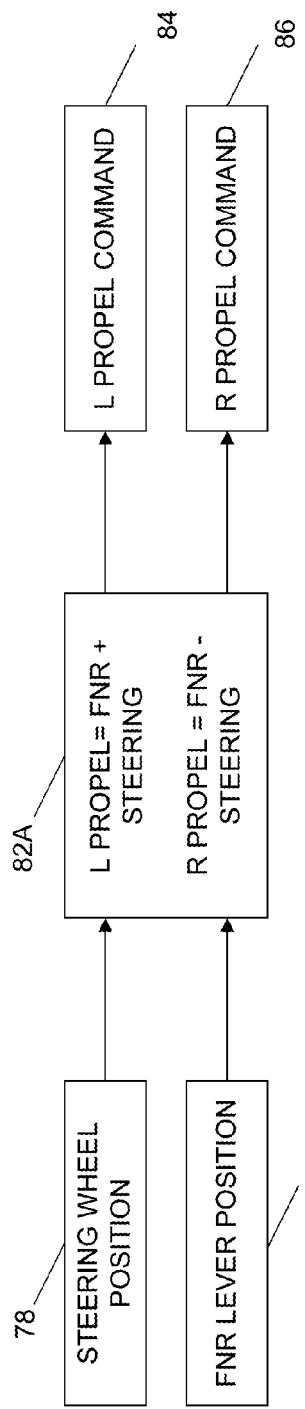
FIG. 5A is a flow diagram that illustrates an embodiment of an example dual-path steering mode method.
Figure 5B:
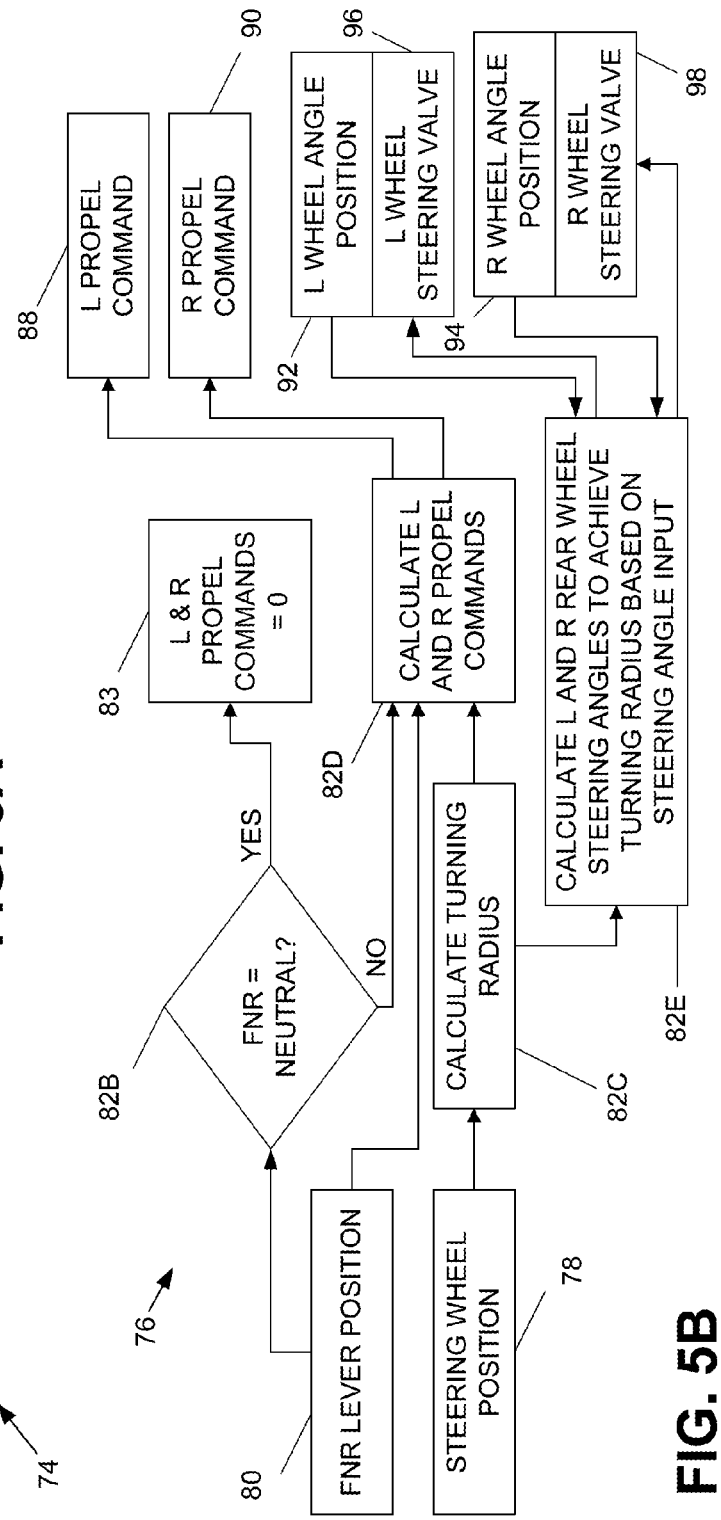
FIG. 5B is a flow diagram that illustrates an embodiment of an example tailwheel steering mode method.

Attention is now directed to FIGS. 5A and 5B (with continued reference to FIG. 2), which are flow diagrams that illustrate methods 74 and 76 for the dual-path steering mode (FIG. 5A) and the tailwheel steering mode (FIG. 5B), respectively. It should be appreciated that the methods 74 and 76 illustrated in FIGS. 5A and 5B are merely illustrative, and that in some embodiments, other and/or a different quantity of steps of the associated algorithm may be implemented. Referring to FIG. 5A, user interface inputs comprising steering wheel position 78 and FNR lever position 80 are received by a dual mode steering module 82A. The dual mode steering module 82A may be hardware, and/or software (e.g., including firmware in some embodiments) executed by one or more processors, such as embodied in the controller 30A. The dual mode steering module 82A determines a left (L) propel command (e.g., for the left wheel propel pump 60, FIG. 2) and a right (R) propel command (e.g., for the right wheel propel pump 66, FIG. 2). For instance, the left propel command equals the received FNR lever position 80 plus the steering wheel position 78, and the right propel command equals the received FNR lever position 80 minus the steering wheel position 78. The dual mode steering module 82A then outputs the left propel command 84 and the right propel command 86 to enable differential wheel speeds (including zero radius turns that involve one of the drive wheels 14 rotating in a direction opposite to that of the other drive wheel 14).

Referring to FIG. 5B, the method 76 for the tailwheel steering mode similarly comprises receiving an FNR lever position 80 and a steering wheel position 78. A dual mode steering module 82B receives the FNR lever position 80 and determines whether the FNR lever is positioned in the neutral (N) position. If so ("Yes"), the dual mode steering module 82B outputs a zero (0) value for the left and right propel commands 83. In other words, the dual mode steering module 82B prevents opposing direction drive wheels in the tailwheel steering mode (but steering based on the steering wheel movement is still enabled, as described below). If the detected position of the FNR lever is not neutral ("No" to 82B), then calculation of the propel commands may be performed based on additional data as described in the following. A dual mode steering module 82C receives the steering wheel position 78 and calculates a turning radius (herein also referred to as a requested or target or targeted turning radius) based on the steering wheel position 78. A dual mode steering module 82D receives the calculated turning radius and the FNR lever position 80, and determines the left and right propel commands. In other words, the dual mode steering module 82D calculates the left and right propel commands based on the FRN lever position 80 and the requested turning radius, and outputs a left propel command 88 and a right propel command 90 to cause differential drive wheel rotation. A dual mode steering module 82E (e.g., as implemented in the controller 30B, though in some embodiments, the module 82E may be implemented in the controller 30A) calculates left and right rear wheel steering angles required to achieve the requested turning radius. Also, the dual mode steering module 82E receives left and right wheel (caster 14A) angle positions 92 and 94, respectively, which enables the dual mode steering module 82E to provide for precise control of the steering angles (e.g., the steer-rotation) based on input from the sensors 46 (e.g., position sensors) to output commands to the control valves of the manifold 32 (FIG. 1). For instance, the dual mode steering module 82E outputs a signal to a left rear wheel (caster) steering valve 96 to cause (via fluid displacement) the steering cylinder 38 to steer-rotate the left tailwheel caster 14A, and outputs a signal to a right rear wheel (caster) steering valve 98 to achieve a similar affect on the right tailwheel caster 14A (FIG. 4). As noted above, the dual mode steering modules 82A-82E may be implemented in a single controller (e.g., 30A or 30B), or divided among plural controllers (e.g., modules 82A-82D in controller 30A and module 82E in controller 30B, where the controllers 30A and 30B are in wireless or wired communication with each other).

Figure 6A:
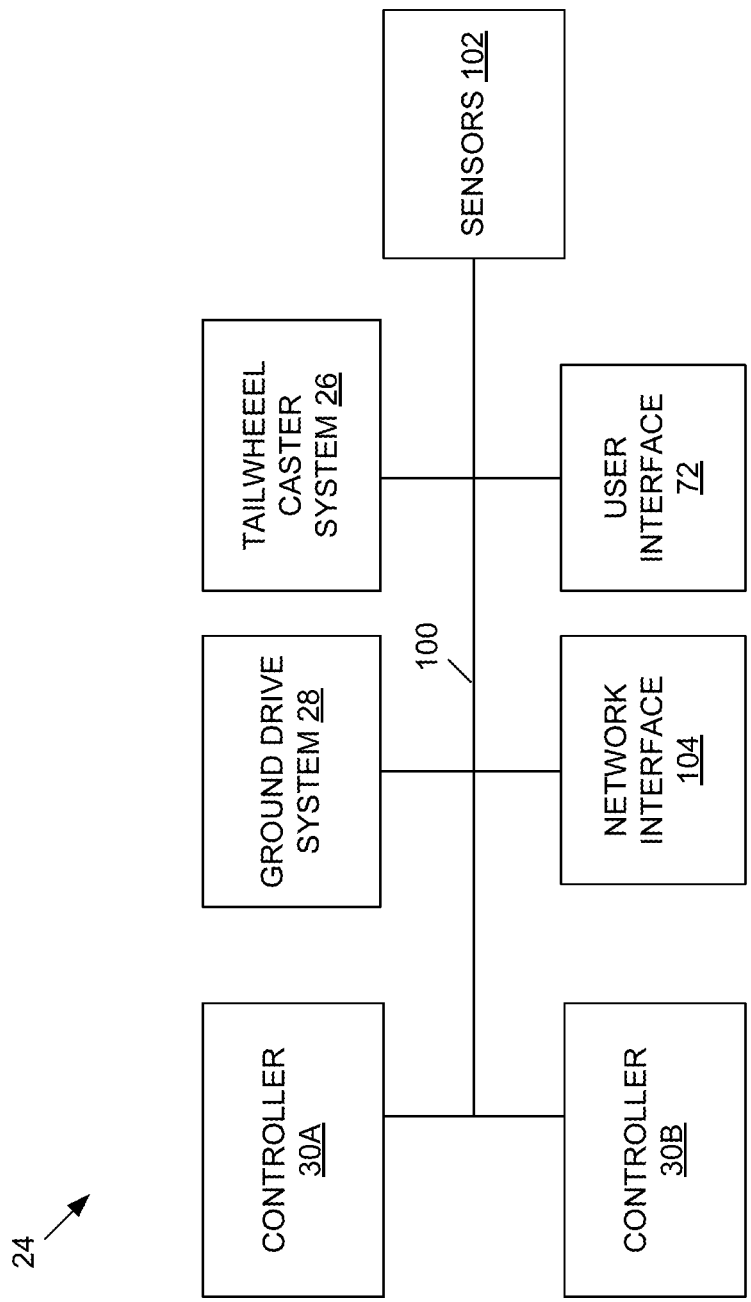
FIG. 6A is a block diagram of an embodiment of an example dual mode steering system.

Having described some example operations of a dual mode steering system 24, attention is directed to FIG. 6A, which illustrates an embodiment of a dual mode steering system 24. It should be appreciated within the context of the present disclosure that some embodiments may include additional components or fewer or different components, and that the example depicted in FIG. 6A is merely illustrative of one embodiment among others. Further, in some embodiments, the dual mode steering system 24 may be distributed among plural machines. For instance, sensing functionality may reside locally with the windrower 10 (FIG. 1) whereas the control of machine steering and/or selection of modes may be administered remotely (e.g., via a remote control server). The dual mode steering system 24 comprises one or more controllers, such as the controllers 30A and 30B. The controllers 30A and 30B are coupled via one or more networks, such as network 100 (e.g., a CAN network or other network, such as a network in conformance to the ISO 11783 standard, also referred to as "Isobus"), to the ground drive system 28, the tailwheel caster system 26, plural sensors 102 (which may include sensor 46 of the tailwheel caster system 26, as well as other sensors of the windrower 10), the user interface 72, and a network interface 104. Note that dual mode steering system architecture depicted in FIG. 6A involves the sharing by the controllers 30A and 30B of the same bus(es), though in some embodiments, other architectures may be used, such as the controllers 30A and 30B daisy-chained such that all information (e.g., sensor input, etc.) is relayed to the controller 30B serving in a slave function via the controller 30A serving in a master function (or vice versa), or in some embodiments, the controllers 30A and 30B may function in a peer-to-peer relationship, where input from the tailwheel caster system 26 and the associated sensors (e.g., 46) communicate solely with the controller 30B, whereas the ground drive system 28 communicates only with the controller 30A. These and/or other variations in the architecture may be implemented, and hence are contemplated to be within the scope of the disclosure.

With continued reference to FIG. 2, the ground drive system 28 includes the various components to enable the windrower 10 to traverse a field, such as the propel pumps 60 and 66, the wheel drive motors 62 and 68, and the hydraulic fluid lines 64 and 70. The tailwheel caster system 26 comprises the various components that enable controlled steering in the tailwheel steering mode, and includes the tailwheel caster assemblies 34 and 36. The sensors 102 include the position sensors of the user interface 72 (e.g., FNR lever and steering wheel), as well as the sensor 46 of each of the tailwheel caster assemblies 34 and 36 that monitor the left and right tailwheel caster angle positions (among other sensors, such as those used to monitor speed of travel, engine load, etc.). The sensors 102 may be embodied as non-contact (e.g., imaging, Doppler, acoustic, terrestrial or satellite based, among other wavelengths, inertial sensors, etc.) and/or contact-type sensors (e.g., pressure transducers, speed sensors, Hall effect, position sensors, strain gauge, etc.), all of which comprise known technology. The user interface 72 may include one or more of a keyboard, mouse, microphone, touch-type display device, joystick, steering wheel, FNR lever, or other devices (e.g., switches, immersive head set, etc.) that enable input and/or output by an operator (e.g., to respond to indications presented on the screen or aurally presented) and/or enable monitoring of machine operations. The network interface 104 comprises hardware and/or software that enable wireless connection to one or more remotely located computing devices over a network (e.g., wireless or mixed wireless and wired networks). For instance, the network interface 104 may cooperate with browser software or other software of the controllers 30A and/or 30B to communicate with a server device over cellular links, among other telephony communication mechanisms and radio frequency communications, enabling remote monitoring or control of the windrower 10 (FIG. 2). The network interface 104 may comprise MAC and PHY components (e.g., radio circuitry, including transceivers, antennas, etc.), as should be appreciated by one having ordinary skill in the art.

In one embodiment, the controllers 30A and/or 30B are configured to receive and process information from the sensors 102, and communicate with the ground drive system 28 and the tailwheel caster system 26 to cause desired navigational movement of the windrower 10 (FIG. 1) based on the input of information from the sensors 102 (e.g., as prompted by sensed movement of components of the user interface 72, which may be prompted by an operator or occur automatically). In some embodiments, the controllers 30A and/or 30B may provide feedback of any automatic or operator-invoked switch between dual-path mode and tailwheel steering mode via a display and/or aurally.

Figure 6B:
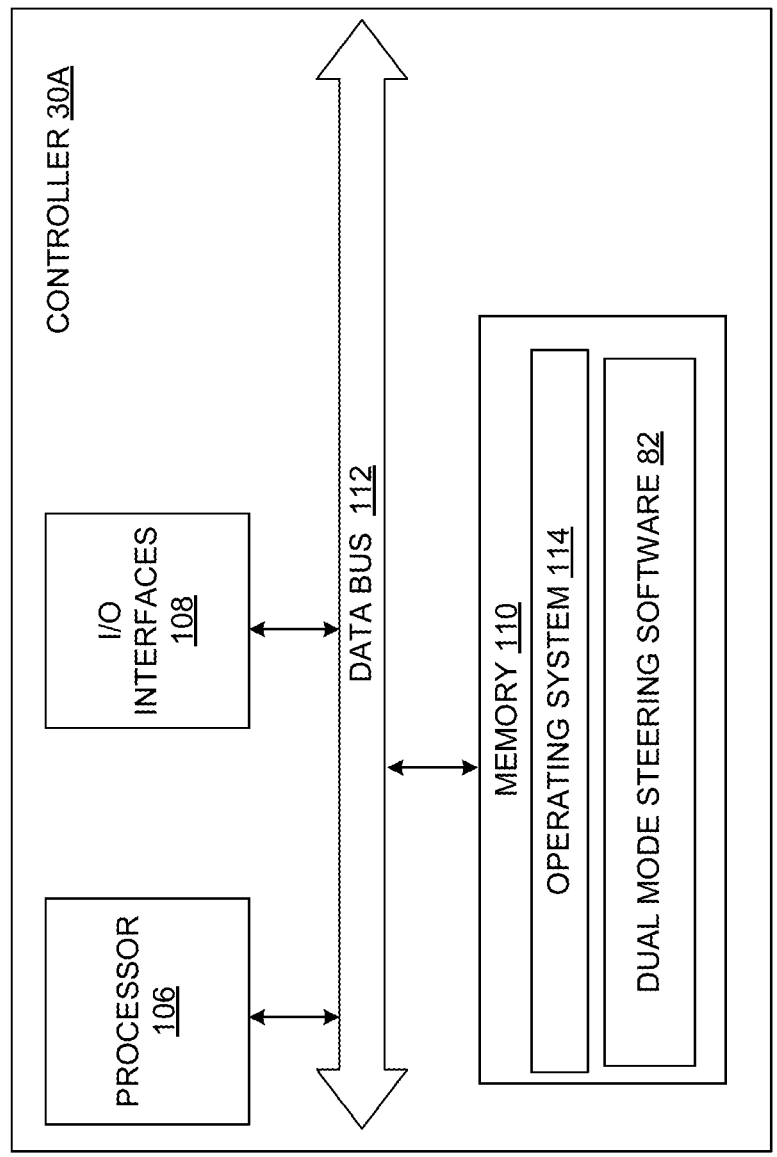
FIG. 6B is a block diagram of an embodiment of an example controller used in an embodiment of an example dual mode steering system.

FIG. 6B further illustrates an example embodiment of the controller 30A. The description associated with FIG. 6A for the controller 30A may similarly apply to the controller 30B. For instance, as set forth above, functionality of the dual mode steering modules 82A-82E (e.g., executable code) may reside within a single controller (e.g., controller 30A or 30B), or be distributed among separate controllers 30A and 30B that are in communication with each other. One having ordinary skill in the art should appreciate in the context of the present disclosure that the example controller 30A is merely illustrative, and that some embodiments of controllers may comprise fewer or additional components, and/or some of the functionality associated with the various components depicted in FIG. 6B may be combined, or further distributed among additional modules, in some embodiments. It should be appreciated that, though described in the context of residing in the windrower 10 (FIG. 1), in some embodiments, the controller 30A, or all or a portion of its corresponding functionality, may be implemented in a computing device or system located external to the windrower 10. Referring to FIG. 6B, with continued reference to FIG. 6A, the controller 30A is depicted in this example as a computer system, but may be embodied as a programmable logic controller (PLC), field programmable gate array (FPGA), application specific integrated circuit (ASIC), among other devices. It should be appreciated that certain well-known components of computer systems are omitted here to avoid obfuscating relevant features of the controller 30A. In one embodiment, the controller 30A comprises one or more processors (also referred to herein as processor units or processing units), such as processor 106, input/output (I/O) interface(s) 108, and memory 110, all coupled to one or more data busses, such as data bus 112. The memory 110 may include any one or a combination of volatile memory elements (e.g., random-access memory RAM, such as DRAM, and SRAM, etc.) and nonvolatile memory elements (e.g., ROM, hard drive, tape, CDROM, etc.). The memory 110 may store a native operating system, one or more native applications, emulation systems, or emulated applications for any of a variety of operating systems and/or emulated hardware platforms, emulated operating systems, etc.

In the embodiment depicted in FIG. 6B, the memory 110 comprises an operating system 114 and dual mode steering software 82. In one embodiment, the dual mode steering software 82 comprises one or more of the modules 82A-82E (FIGS. 3A-3B). For the controller 30B (FIG. 2), the dual mode steering software 82 may only include module 82E, or in some embodiments, one or more of modules 82A-82D in addition to module 82E. It should be appreciated that in some embodiments, additional or fewer software modules (e.g., combined functionality) may be deployed in the memory 110 or additional memory. In some embodiments, a separate storage device may be coupled to the data bus 112, such as a persistent memory (e.g., optical, magnetic, and/or semiconductor memory and associated drives).

The dual mode steering software 82 receives input corresponding the steering wheel position 78, the FNR lever position 80, and in some embodiments (e.g., when implementing functionality associated with software module 82E), the left and right wheel (caster) angle positions 92 and 94, respectively (see, e.g., FIGS. 3A-3B). The dual mode steering software 82 uses at least some of the information to control operation of the drive wheels 14. The dual mode steering software 82 further determines whether the neutral position is selected by the operator (e.g., corresponding to the FNR lever) to determine whether to enable zero radius functionality (in dual-path steering mode) or not (in tailwheel steering mode). The dual mode steering software 82 also determines a turning radius based on the steering wheel position 78 according to mechanisms well-known in the art. In embodiments where the dual mode steering software 82 includes module 82E, the dual mode steering software 82 calculates left and rear wheel (caster) steering angles needed to achieve the requested turning radius, based on feedback from the left and right wheel (caster) angle positions 92 and 94.

Execution of the dual mode steering software 82 may be implemented by the processor 106 under the management and/or control of the operating system 114. In some embodiments, the operating system 114 may be omitted and a more rudimentary manner of control implemented. The processor 106 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 30A.

The I/O interfaces 108 provide one or more interfaces to the network 100 and other networks. In other words, the I/O interfaces 108 may comprise any number of interfaces for the input and output of signals (e.g., analog or digital data) for conveyance of information (e.g., data) over the network 100. The input may comprise input by an operator (local or remote) through the user interface 72 and input from signals carrying information from one or more of the components of the dual mode steering system 24, such as the sensors 102 and/or the network interface 104, among other devices.

When certain embodiments of the controller 30A (and controller 30B) are implemented at least in part with software (including firmware), as depicted in FIG. 6B, it should be noted that the software (e.g., such as the modules 82) can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the controller 30A (and controller 30B) are implemented at least in part with hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

Figure 7:
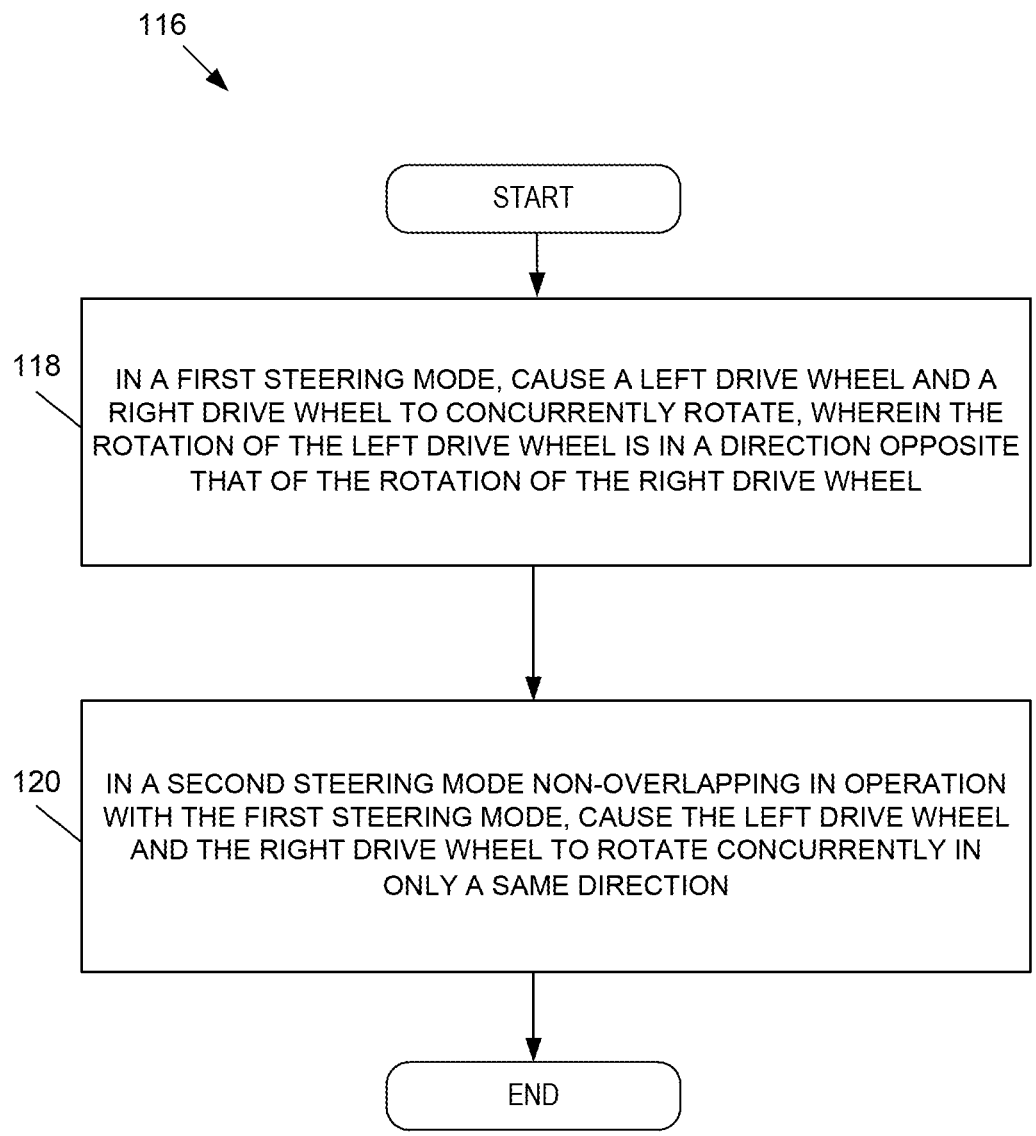
FIG. 7 is a flow diagram that illustrates an embodiment of an example dual mode steering method.

In view of the above description, it should be appreciated that one embodiment of a dual mode steering method 116, depicted in FIG. 7, comprises: in a first steering mode, causing a left drive wheel and a right drive wheel to concurrently rotate, wherein the rotation of the left drive wheel is in a direction opposite that of the rotation of the right drive wheel (118); and in a second steering mode non-overlapping in operation with the first steering mode, causing the left drive wheel and the right drive wheel to rotate concurrently in only a same direction. In other words, when the left and right drive wheels do rotate concurrently, the rotation is only in the same direction (and not permitted in the reverse direction).

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Although the control systems and methods have been described with reference to the example embodiments illustrated in the attached drawing figures, it is noted that equivalents may be employed and substitutions made herein without departing from the scope of the disclosure as protected by the following claims.

At least the following is claimed:

1. A windrower machine operable in two steering modes selectable by an operator of the machine, the dual steering modes being a dual-path steering mode and a tailwheel steering mode, the two steering modes being mutually exclusive, the machine comprising:
   a chassis;
   an engine mounted on the chassis;
   plural drive wheels coupled to the chassis;

a ground drive system comprising plural wheel motors and plural hydraulic wheel propel pumps coupled to a respective one of the plural drive wheels, the hydraulic wheel propel pumps being powered by the engine and each wheel motor being powered by its respective hydraulic wheel propel pump;

plural tailwheel caster assemblies coupled to opposing sides of the chassis, each tailwheel caster assembly comprising:
 a tailwheel caster;
 a sensor;
 a steering cylinder configured to operably control a steering position of the tailwheel caster when in the tailwheel steering mode;

a user interface comprising a steering wheel and a forward-neutral-reverse (FNR) lever operable to control the ground drive system, the FNR lever having a forward position, a neutral position and a reverse position; and a controller configured to selectably operate the ground drive system in the dual path steering mode and in the tailwheel steering mode:
 wherein in the dual-path steering mode, the ground drive system selectively drives the plural drive wheels in the same direction and also selectively drives the plural drive wheels in the opposite direction of rotation relative to each other depending on the position of the steering wheel and FNR lever, and the position of tailwheel casters are not controlled by the steering cylinders but are permitted unconstrained rotation, and
 wherein in the tailwheel steering mode, the ground drive system drives the plural drive wheels only in the same direction of rotation with the controller sending a signal so that the plural drive wheels are incapable of counter rotation in the tailwheel steering mode and the steering cylinder provides controlled and limited steer-rotation of the tailwheel caster based in part on tailwheel caster steer position information received from the sensor.

2. The machine of claim 1, wherein the controller is configured to cause the steering cylinder to control and limit steer-rotation of the tailwheel caster when in the tailwheel steering mode based in part on a target turning radius.

3. The machine of claim 1, wherein in the dual-path steering mode and when the FNR lever is in the neutral position, rotation of the steering wheel causes the ground drive system to turn the machine in a zero radius turn such that the drive wheels are driven in opposite directions, and wherein when in the tailwheel steering mode and the FNR lever is in the neutral position, rotation of the steering wheel causes the ground drive system to steer the angle of the tailwheel casters and does not result in rotation of the drive wheels such that the machine does not turn in a zero radius turn.

4. The windrower of claim 1, further comprising a sensor operably coupled to the tailwheel caster, the sensor detecting a steering position of the tailwheel caster.

5. The windrower of claim 4, further comprising:
 a steering cylinder coupled to the tailwheel caster; and
 wherein the controller is configured to receive a signal from the sensor and, based on the signal and a target turning radius, adjust a steer position of the tailwheel caster by causing adjustment of the steering cylinder.

* * * * *